United States Patent
Michi et al.

(10) Patent No.: US 6,611,741 B2
(45) Date of Patent: Aug. 26, 2003

(54) METHOD AND DEVICE FOR MISMATCH RECOGNITION IN A VEHICLE RADAR SYSTEM OR A VEHICLE SENSOR SYSTEM

(75) Inventors: Harald Michi, Oelbronn-Duerrn (DE); Bernd Lichtenberg, Vaihingen/Enz (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 09/914,606
(22) PCT Filed: Dec. 22, 2000
(86) PCT No.: PCT/DE00/04620
§ 371 (c)(1), (2), (4) Date: Jan. 2, 2002
(87) PCT Pub. No.: WO01/50154
PCT Pub. Date: Jul. 12, 2001

(65) Prior Publication Data
US 2002/0165650 A1 Nov. 7, 2002

(30) Foreign Application Priority Data
Dec. 30, 1999 (DE) .......... 199 64 020

(51) Int. Cl.⁷ .......... G06F 7/00
(52) U.S. Cl. .......... 701/29; 701/79; 701/81; 701/223; 303/140; 303/146
(58) Field of Search .......... 701/29, 69, 74, 701/79, 81, 223, 225; 303/140, 146

(56) References Cited

U.S. PATENT DOCUMENTS

| | | | | |
|---|---|---|---|---|
| 5,644,314 A | * | 7/1997 | Ahmad et al. | .......... 342/22 |
| 5,930,739 A | | 7/1999 | Constancis | |
| 5,977,906 A | | 11/1999 | Ameen et al. | |
| 5,986,601 A | | 11/1999 | Sugimoto | |

FOREIGN PATENT DOCUMENTS

| | | |
|---|---|---|
| DE | 196 33 704 | 10/1997 |
| DE | 198 33 065 | 1/1999 |
| DE | 197 36 965 | 5/1999 |
| DE | 197 51 004 | 5/1999 |

* cited by examiner

Primary Examiner—Gertrude Arthur
(74) Attorney, Agent, or Firm—Kenyon & Kenyon

(57) ABSTRACT

A method for detecting misalignment in a motor vehicle sensor system, in which signals are emitted, signals reflected by a stationary object are received, and a relative angle and a relative distance or a longitudinal displacement and a transverse displacement between the detected object and a reference axis of the motor vehicle as well as a relative velocity between the detected object and the motor vehicle are determined on the basis of the signals emitted and received. A correction value is determined for the relative angle on the basis of the relative angle, the relative distance, and a velocity of the vehicle in question or on the basis of the longitudinal displacement, the transverse displacement, and the vehicle's own velocity.

8 Claims, 2 Drawing Sheets

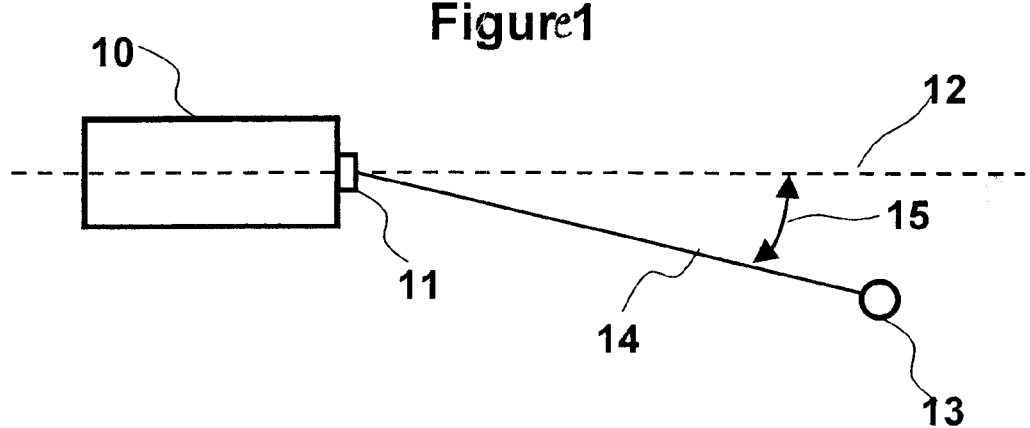
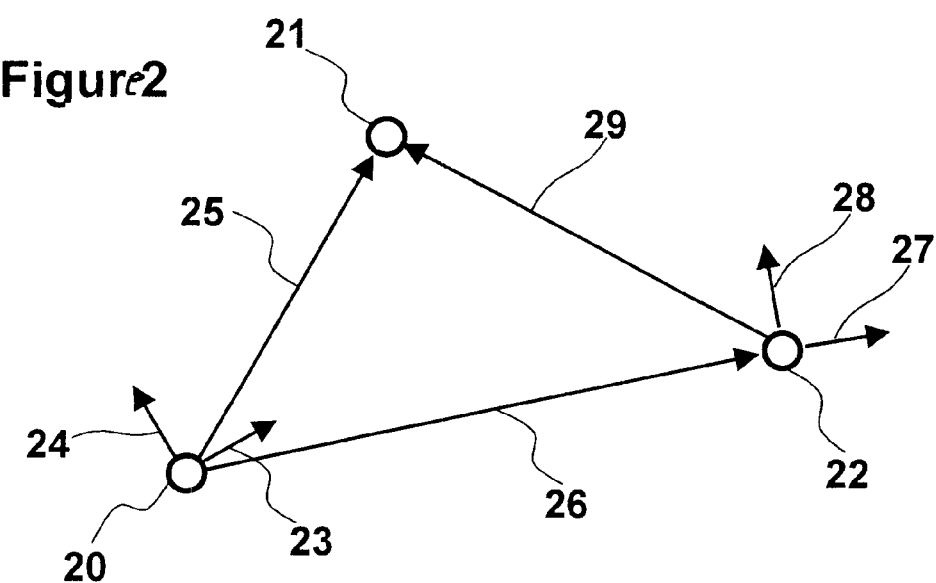
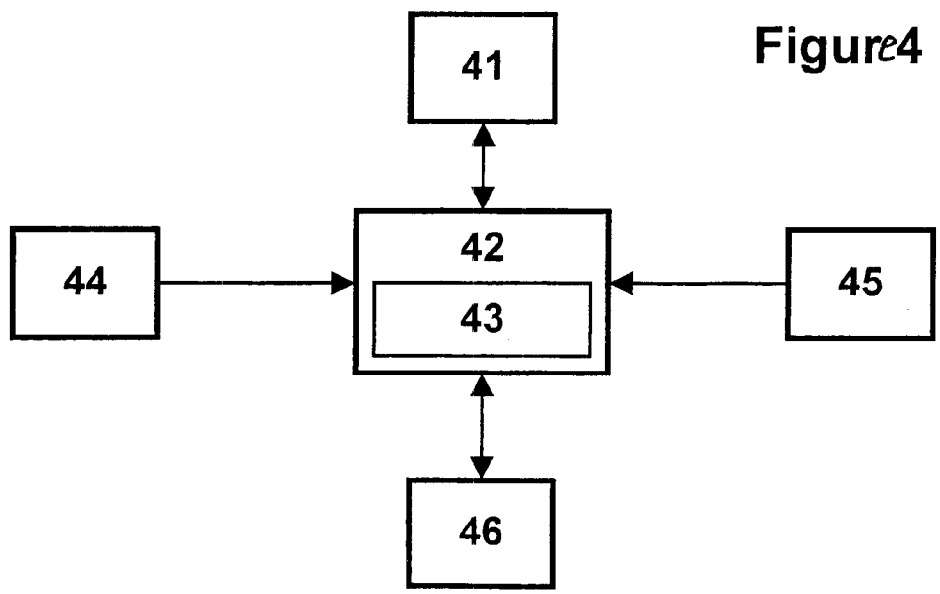

METHOD AND DEVICE FOR MISMATCH RECOGNITION IN A VEHICLE RADAR SYSTEM OR A VEHICLE SENSOR SYSTEM

FIELD OF THE INVENTION

The present invention relates to a method and device for detecting misalignment in a motor vehicle radar system or a motor vehicle sensor system. Such methods and such devices are used, for example, within the framework of an automatic cruise control system of a vehicle for detecting preceding vehicles. A system of this type is also known as Adaptive Cruise Control (ACC). When installing the motor vehicle radar system in the motor vehicle, an exact procedure and a precise alignment of a central axis of the radiated electromagnetic waves to a central line of the motor vehicle in the longitudinal direction are performed.

BACKGROUND INFORMATION

U.S. Pat. No. 5,930,739 describes a method for measuring the yaw rate of a motor vehicle equipped with a LIDAR radar. In this method, the yaw rate ascertained by a yaw-rate sensor on the basis of the vehicle's own velocity, a longitudinal distance to a fixed detection object, and the relative transverse velocity of the same fixed detection object in relation to the vehicle. The disadvantage of this method is that small offsets and far away detection objects are necessary for exact determination or correction. However, in radar applications, distant objects, in particular, are "weak targets," which are difficult to measure, and whose position in the transverse direction to the vehicle in question cannot always be precisely determined due to the limited angular resolution of the radar system. For the same reason (limited angular resolution), the determination of transverse velocities of detected objects, in particular at greater distances, is also faulty.

German Patent No. 197 36 965 describes a method and an arrangement for testing the yaw rate of a moving object, in particular of a motor vehicle. In this context, the yaw rate is tested with the aid of objects that are located in the vehicle's instantaneous environment. The objects detected by an environment sensor must be stationary objects. In this case, the actual position of the detected object is compared to a projection derived from the first measurement of the detected object as to the actual position. For this purpose, an object track is defined that includes all positions of the detected object at different, preselected times. In this context, the object track is formed starting from the determined position of the detected object, with the aid of the velocity and the yaw rate of the motor vehicle. The disadvantage of the method is that it is necessary to analyze the determined radial distance of the detected object to the motor vehicle in question into X and Y position coordinates. Typically, the angle of the detected object goes into such an analysis, the angle not being able to be determined in a particularly precise manner in the case of a system functioning on a laser or radar basis since a limited angle resolution must be used as a baseline.

German Published Patent Application No. 197 51 004 describes a method for processing radar signals, in which an instantaneous moving direction is determined by evaluating a plurality of object tracks formed for detected objects. In the event that this moving direction deviates from the alignment of the radar system, the object angles determined when detecting the objects within the framework of the angle resolution of the radar system are corrected by the determined deviation and related to the moving direction. The method relates to a trajectory analysis of the detected objects, the reflections of stationary objects being used in particular, since they form a particularly favorable foundation for determining the average moving direction.

An angular displacement determining device for determining the angular displacement of the radar central axis for use in a detection system for a motor vehicle is known from German Published Patent Application No. 198 33 065. In the case of this device, two situations are differentiated when determining the positions of the targets. The first case is that preceding vehicles are detected while the own vehicle travels straight. In this context, in the case of a correctly adjusted detection system, the result should be a distribution of the detected positions of the preceding vehicles that is parallel to the own travel direction. If this is not the case, a centroid is formed, a corresponding offset line is determined, and the detection system is accordingly corrected. The second case is that the own vehicle is cornering. In this case, an analysis of the relative velocity vectors between the own vehicle and the detected objects is performed. The disadvantage of this method is that the X and Y components of the relative velocity vector, which, as previously stated, cannot be determined in a particularly precise manner, are necessary for an analysis of the relative velocity vectors.

SUMMARY OF THE INVENTION

In comparison with the related art, the method according to the present invention is further refined in that, in the case of a method for detecting misalignment in a motor vehicle radar system, in which electromagnetic waves are emitted, electromagnetic waves reflected by a stationary object are received, and a relative angle (alpha_m) and a relative distance (d_m) or a longitudinal displacement and a transverse displacement between the detected object and a reference axis of the motor vehicle as well as a relative velocity (d_m_punkt) between the detected object and the motor vehicle are determined on the basis of the signals emitted and received, a correction value (alpha_null) is determined for relative angle (alpha_m) on the basis of relative angle (alpha_m), relative distance (d_m), and a velocity (v_F) of the vehicle in question or on the basis of the longitudinal displacement, the transverse displacement, and the vehicle's own velocity (v_F). The method according to the present invention has the advantage that a correction value can be determined for the system itself from the measured values already present in a motor vehicle radar system. A quick and reliable correction of the measured angle value of the motor vehicle radar system is possible in this manner.

An advantageous further refinement of the method according to the present invention provides that a correction value (Psi_null_punkt) for yaw rate (Psi_m_punkt) is determined on the basis of relative angle (alpha_m), correction value (alpha_null), relative distance (d_m), relative velocity (d_m_punkt), the vehicle's own velocity (v_F), and a yaw rate (Psi_m_punkt) supplied by a yaw-rate sensor. In other words: The measured yaw rate value supplied by any yaw-rate sensor can be corrected with the aid of the measured value supplied by the motor vehicle radar system. A reliable, quick determination of the yaw rate of the motor vehicle is possible in this manner.

In a particularly advantageous further refinement of the method according to the present invention, a yaw rate (Psi_punkt) of the motor vehicle is determined on the basis of relative angle (alpha_m), correction value (alpha_null), relative distance (d_m), relative velocity (d_m_punkt), and the vehicle's own velocity (v_F). As a result of the method according to the present invention, it is possible with the aid of the data supplied by a motor vehicle radar system to quickly and reliably determine the yaw rate of the motor vehicle without a conventional yaw-rate sensor having to be present in the motor vehicle.

The great advantage of the method according to the present invention and of the device according to the present invention is that the offset determination of the measured angle value and the measured yaw rate value as well as the yaw rate determination can be carried out while the vehicle is in operation "online." Thus, a shifting offset of the measured angle value and of the measured yaw rate value can be permanently and correctly compensated for even while the motor vehicle is in operation. It is not necessary to separately measure the sensors, e.g. in a workshop. In this context, the method according to the present invention is not based on an averaging of data ascertained by the motor vehicle radar system from stationary objects, but on a calculation having the data ascertained from the stationary objects as a basis. A further decided advantage is that the calculation can be performed in any driving situation, independently of whether the motor vehicle is moving in a straight line or is cornering.

BRIEF DESCRIPTION OF THE DRAWINGS

FIG. 1 shows a motor vehicle detecting a stationary object.

FIG. 2 shows a representation of the coordinate systems that are taken into consideration for the determination of the misalignment.

FIG. 4 shows a representation of a device according to the present invention.

DETAILED DESCRIPTION

Figure 3:
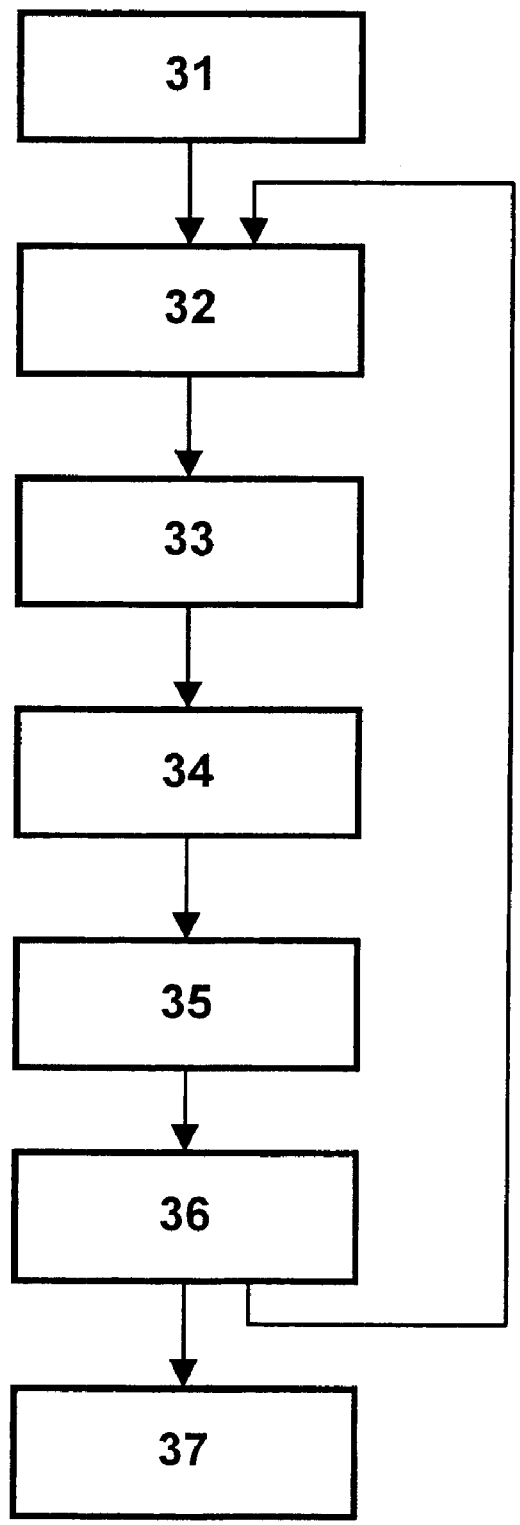
FIG. 3 shows a flow chart of the method according to the present invention.

FIG. 1 shows a motor vehicle 10, which is equipped with a motor vehicle radar system 11 according to the present invention, which, in this exemplary embodiment, is mounted in the travel direction, in the center of motor vehicle 10. Reference numeral 12 designates the longitudinal axis of the motor vehicle to which the beam direction of radar system 11 should also ideally be aligned. 13 designates a possible stationary object, e.g. a distance marker on the side of the road or a tree, detected by radar system 11. The distance to detected object 13 is designated by reference numeral 14, and the angle of the detected position in relation to vehicular longitudinal axis 12 is designated by reference numeral 15. According to the present invention, a possible misalignment of radar system 11 is determined on the basis of the measured data supplied by stationary object 13, with the aid of the vehicle's own velocity. In the extreme case, only a detected position of stationary target 13 is necessary for this purpose. If one and the same target is detected in a plurality of detection steps, the calculated or determined correction values for the radar system can be accordingly filtered. If more than one stationary object is detected, which is more often the rule in practice, the determined correction values for the radar system can be averaged over a plurality of objects. According to the present invention, following the determination of a correction value for the angle measurement of the radar system, the yaw rate of the motor vehicle can either be determined or corrected with the aid of a signal supplied by a yaw-rate sensor. Other statistical aftertreatments are also within the framework of the method according to the present invention. In this context, the type and manner of the aftertreatment can also be made dependent on how much time is available for evaluating or determining the correction values and/or the yaw rate.

FIG. 2 shows a representation of the coordinate systems that are taken into consideration for the determination of the misalignment. In this context, 20 designates a fixed world point, the origin of the "world coordinates system" as it were. 22 designates the current position of the motor vehicle, and 21 designates the possible position of a detected, stationary object. 23 and 24 represent the unit vectors of the world coordinates system, and 27 and 28 represent the unit vectors of the vehicular coordinate system.

The vector that describes the position of stationary object 21 in the world coordinates system results from a sum of scalar multiples of the unit vectors of world coordinates system 23, 24:

$$R\_WO\_vektor(t) = x\_1W \cdot e\_1W\_vektor + x\_2W \cdot e\_2W\_vektor$$

From the view of motor vehicle 22, the position of stationary object 21 results from a sum of scalar multiples of the unit vectors of vehicular coordinate system 23, 24:

$$R\_FO\_vektor(t) = x\_1F \cdot e\_1F\_vektor + x\_2F \cdot e\_2F\_vektor$$

If the vector that describes the position of the vehicle from the view of the fixed world is designated by R_WF_vektor (t), the position of object 22 can also be described as follows:

$$R\_WO\_vektor(t) = R\_WF\_vektor(t) + R\_FO\_vektor(t) = R\_WF\_vektor(t) + x\_1F \cdot e\_1F\_vektor + x\_2F \cdot e\_2F\_vektor$$

where:

| | |
|---|---|
| (t) = | time dependence of the value concerned |
| R_WO_vektor(t) = | vector from the fixed world to object 25 |
| e_1W_vektor and e_2W_vektor = | unit vectors of world coordinates system 23, 24 |
| x_1W and x_2W = | scalar factors in the world coordinates system |
| R_FO_vektor(t) = | vector from the vehicle to object 29 |
| e_1F_vektor and e_2F_vektor = | unit vectors 27, 28 of the vehicular coordinate system |
| x_1F and x_2F = | scalar factors in the vehicular coordinate system |
| R_WF_vektor(t) = | vector from the fixed world to vehicle 26 |

Starting from these statements, one can determine defining equations for the offsets of angle and yaw rate by applying the relationships seen in FIG. 1, the equations being able to be simplified on the condition of small angle offsets. Thus, according to the present invention, the offsets for angle and yaw rate are derived according to the following relationships:

| | |
|---|---|
| alpha_null ≈ | (−(cos(alpha_m) / sin(alpha_m)) − (1 / sin(alpha_m) · d_m_Punkt / v_F)) |
| Psi_null_punkt ≈ | Psi_m_Punkt − v_F / (d_m · d_m_punkt) · (d/dt (d_m · sin(alpha_m)) − alpha_null · d/dt(d_m · cos(alpha_m))) |
| where: | |
| d/dt (z) = | time derivative of z (z as an example for any value |

-continued

| | |
|---|---|
| | to be derived with respect to time) |
| alpha_null = | angle offset of the environment sensor |
| alpha_m = | measured angle value not offset corrected |
| d_m = | measured distance |
| d_m_punkt = | measured relative velocity |
| v_F = | vehicle's own velocity |
| Psi_null_punkt = | yaw rate offset |
| Psi_m_punkt = | measured yaw rate value not offset corrected |

According to the present invention, if the absolute, offset-free values for angle and yaw rate are to be specified, the following results:

$$alpha = alpha\_m - alpha\_null$$

and $$Psi\_punkt = Psi\_m\_punkt - Psi\_null\_punkt$$

consequently:

| | |
|---|---|
| alpha ≈ | alpha_m + (cos(alpha_m) / sin(alpha_m)) + (1 / sin(alpha_m)) · d_m___Punkt / v_F) |
| Psi_punkt ≈ | v_F / (d_m · d_m_punkt) · (d/dt (d_m · sin(alpha_m)) − alpha_null · d/dt(d_m · cos(alpha_m))) |
| where: | |
| alpha = | determined offset-free angle value |
| Psi_punkt = | determined offset-free yaw rate value |

In this instance, in a particularly advantageous manner, there is no more dependency on a measured yaw rate in the defining equation for the rate of rotation. Thus, in the event of the loss or malfunction of the yaw-rate sensor, a replacement value can be determined, or the determined yaw rate value can be used for a plausibility check of the measured yaw rate value.

FIG. 3 shows a flowchart of the method according to the present invention. The initial operation of the motor vehicle or of the motor vehicle radar system begins in block 31. The angle values, distance values, and relative velocity values of a stationary object measured by the radar system are determined in step 32. In step 33, the vehicle's own velocity is measured or accepted by a bus system or an instrument cluster. Depending on whether the yaw rate value is to be determined without the measured yaw rate value or whether a correction value is to be determined for the measured yaw rate value, the measured yaw rate value is measured in step 34. In step 35, the determination of the correction values for the angle error of the radar system is carried out in accordance with the present invention and either the determination of the correction value for the yaw rate or of the yaw rate itself. This data is read into a memory in step 36 and is filtered and/or averaged there in accordance with the explanations of FIG. 1. The final determined correction values for the angle error in the radar system and either the determination of the correction value for the yaw rate or of the yaw rate itself are output in step 37.

FIG. 4 shows a representation of a device according to the present invention. 41 designates a radar sensor, which transmits its measured data to a control unit 42. Furthermore, integrated in control unit 42 is a memory, filter, and averaging unit 43, which can assume the functions indicated in the descriptions of FIGS. 1 and 3. A sensor for the vehicle's own velocity present in the motor vehicle is designated by reference numeral 44 and a yaw-rate sensor by 45. Reference numeral 46 designates a bus system, e.g. a CAN bus, possibly present in the vehicle.

The great advantage of the method according to the present invention is that measured data of stationary objects is used along with the indicated relationships to determine angle offset, yaw rate offset, and the yaw rate itself.

In general, sensor 41 shown in FIG. 4 can be a standard sensor with which the position of target object 13 with respect to vehicle 10 with regard to distance and angle or longitudinal and transverse displacement can be determined. In addition to the radar principle described in detail in the preceding figures, such sensors can also be configured as LIDAR sensors, ultrasonic sensors, infrared sensors or as optical CCD or CMOS sensors, for example. In this context, the relative velocity to be determined between vehicle 10 and target object 13 can also be calculated from ascertained distance data. When using longitudinal displacement values and transverse displacement values instead of distance values and angle values, the formulae specified in the description of the exemplary embodiments are to be accordingly adapted by one skilled in the art.

What is claimed is: please add the following new claims:

1. A method for detecting a misalignment in a motor vehicle radar system, comprising the steps of:
   emitting an electromagnetic wave;
   receiving an electromagnetic wave reflected by a stationary object to detect the stationary object;
   determining on the basis of the emitted electromagnetic wave and the reflected electromagnetic wave a relative velocity between the detected stationary object and a motor vehicle and one of the following:
      a set including a relative angle and a relative distance between the detected stationary object and a reference axis of the motor vehicle, and
      a set including a longitudinal displacement and a transverse displacement between the detected stationary object and the reference axis; and
   determining a correction value for the relative angle on the basis of one of:
      a set including the relative angle, the relative distance, and a velocity of the motor vehicle, and
      a set including the longitudinal displacement, the transverse displacement, and the velocity of the motor vehicle.

2. The method according to claim 1, further comprising the step of:
   determining a correction value for a yaw rate supplied by a yaw-rate sensor on the basis of the relative angle, the correction value for the relative angle, the relative distance, the relative velocity, the velocity of the motor vehicle, and the yaw rate.

3. The method according to claim 1, further comprising the step of:
   determining a yaw rate of the motor vehicle on the basis of the relative angle, the correction value for the relative angle, the relative distance, the relative velocity, and the velocity of the motor vehicle.

4. The method according to claim 1, wherein:
   the method is implemented independently of a current driving situation of the motor vehicle.

5. The method according to claim 1, wherein:
   the method is implemented independently of a cornering.

6. A device for detecting a misalignment in a motor vehicle radar system, comprising:
   an arrangement for emitting an electromagnetic wave;
   an arrangement for receiving an electromagnetic wave reflected by a stationary object to detect the stationary object;

an arrangement for determining on the basis of the emitted electromagnetic wave and the reflected electromagnetic wave a relative velocity between the detected stationary object and a motor vehicle and one of the following:
  a set including a relative angle and a relative distance between the detected stationary object and a reference axis of the motor vehicle, and
  a set including a longitudinal displacement and a transverse displacement between the detected stationary object and the reference axis; and
an arrangement for determining a correction value for the relative angle on the basis of one of:
  a set including the relative angle, the relative distance, and a velocity of the motor vehicle, and
  a set including the longitudinal displacement, the transverse displacement, and the velocity of the motor vehicle.

7. A method for detecting a misalignment in a motor vehicle radar system, comprising the steps of:
  emitting a signal;
  receiving a signal reflected by a stationary object to detect the stationary object;
  determining on the basis of the emitted signal and the reflected signal a relative velocity between the detected stationary object and a motor vehicle and one of the following:
    a set including a relative angle and a relative distance between the detected stationary object and a reference axis of the motor vehicle, and
    a set including a longitudinal displacement and a transverse displacement between the detected stationary object and the reference axis; and
  determining a correction value for the relative angle on the basis of one of:
    a set including the relative angle, the relative distance, and a velocity of the motor vehicle, and
    a set including the longitudinal displacement, the transverse displacement, and the velocity of the motor vehicle.

8. A device for detecting a misalignment in a motor vehicle radar system, comprising:
  an arrangement for emitting a signal;
  an arrangement for receiving a signal reflected by a stationary object to detect the stationary object;
  an arrangement for determining on the basis of the emitted signal and the reflected signal a relative velocity between the detected stationary object and a motor vehicle and one of the following:
    a set including a relative angle and a relative distance between the detected stationary object and a reference axis of the motor vehicle, and
    a set including a longitudinal displacement and a transverse displacement between the detected stationary object and the reference axis; and
  an arrangement for determining a correction value for the relative angle on the basis of one of:
    a set including the relative angle, the relative distance, and a velocity of the motor vehicle, and
    a set including the longitudinal displacement, the transverse displacement, and the velocity of the motor vehicle.

\* \* \* \* \*